Jan. 2, 1962 W. B. ZERN 3,015,348
SYSTEM FOR ASSEMBLING PREHUNG DOORS AND JAMBS
Filed Nov. 17, 1958 10 Sheets-Sheet 8
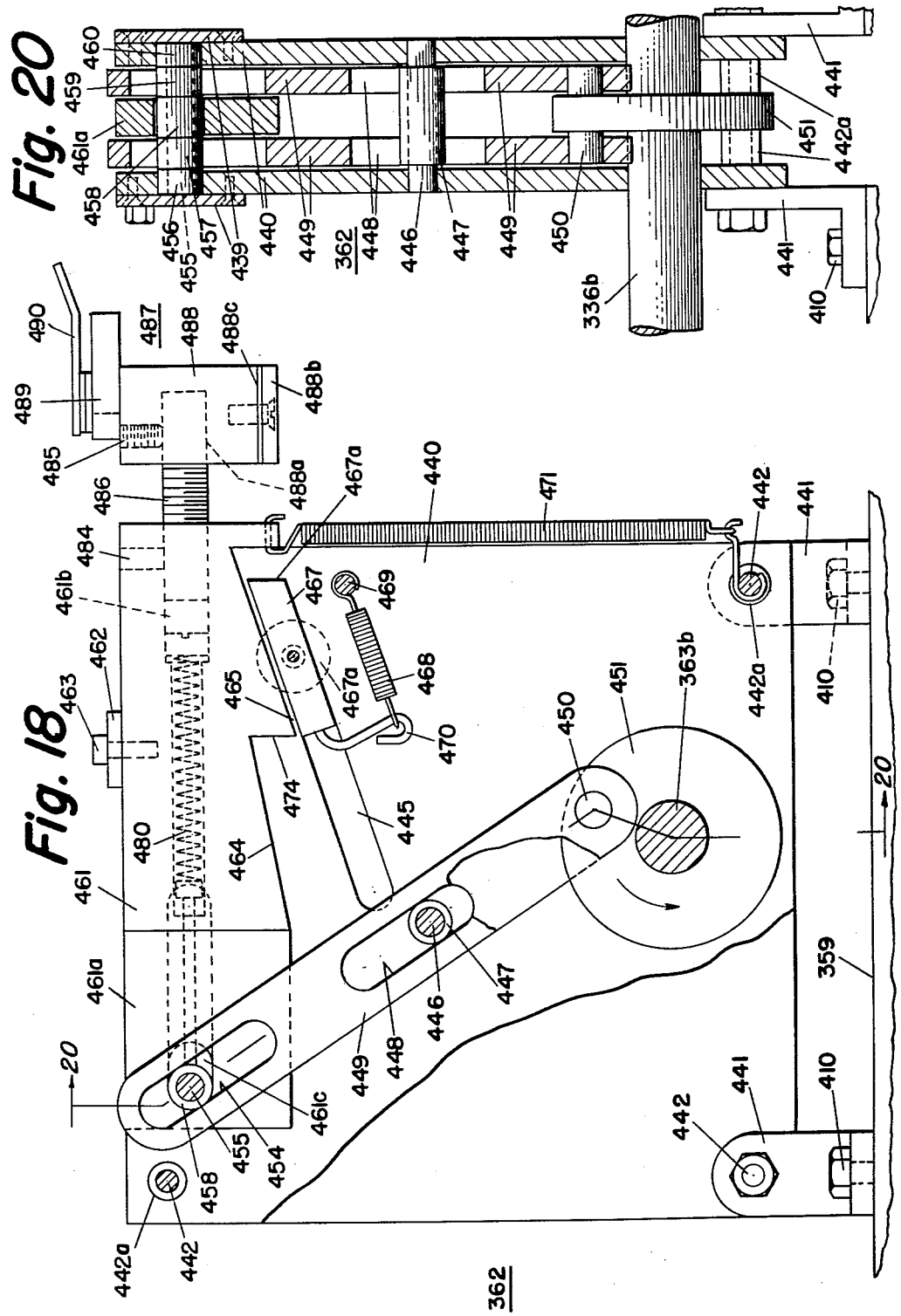

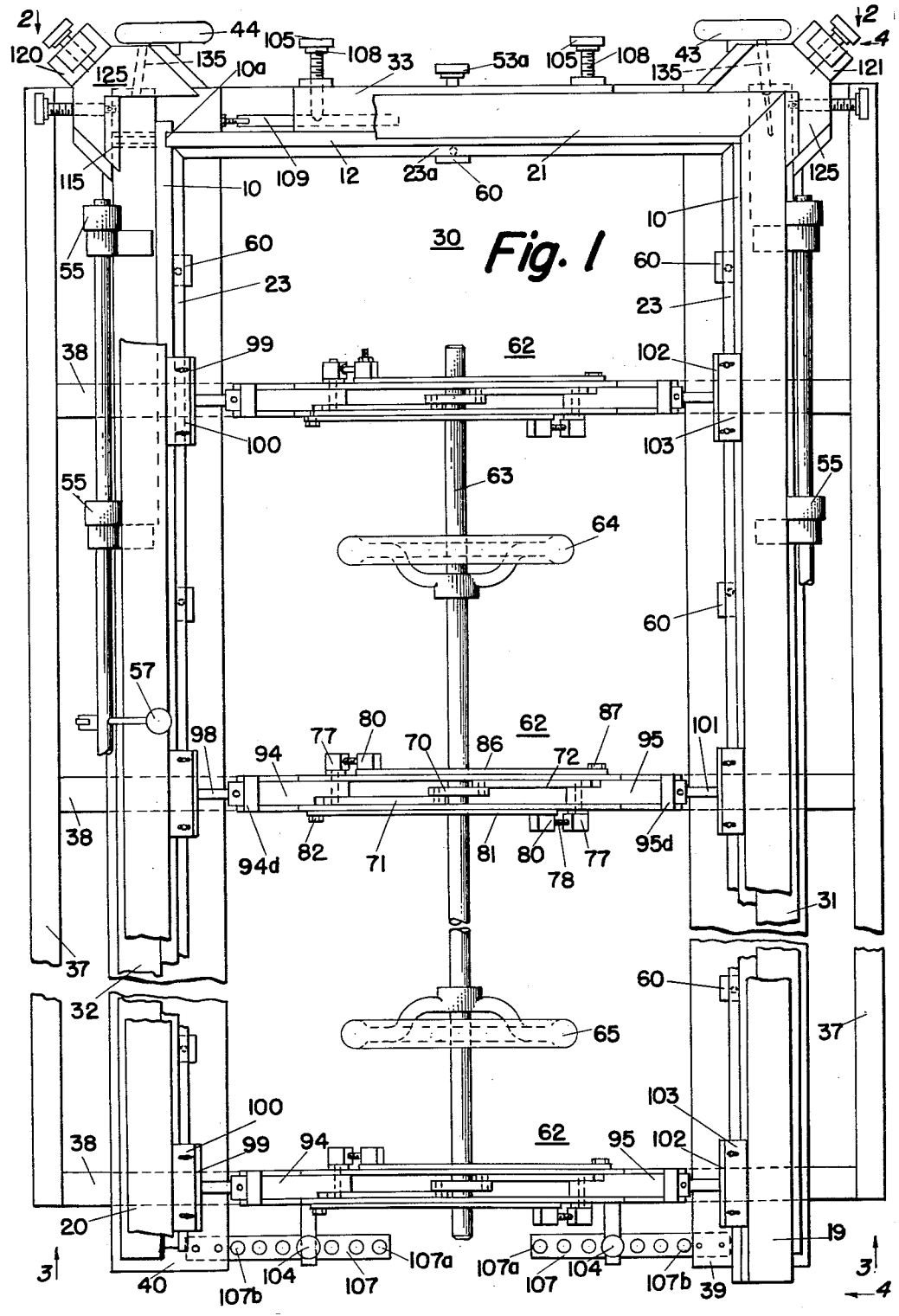

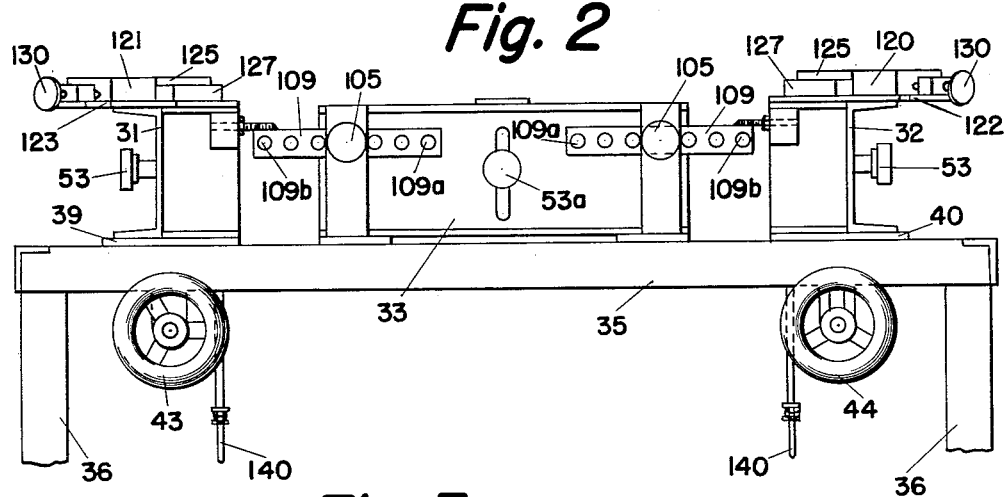
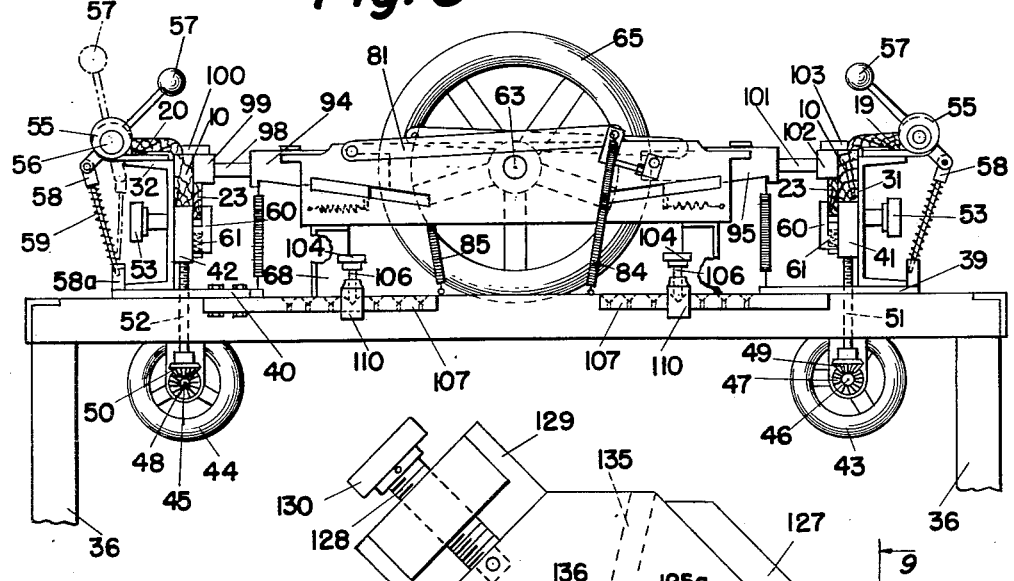
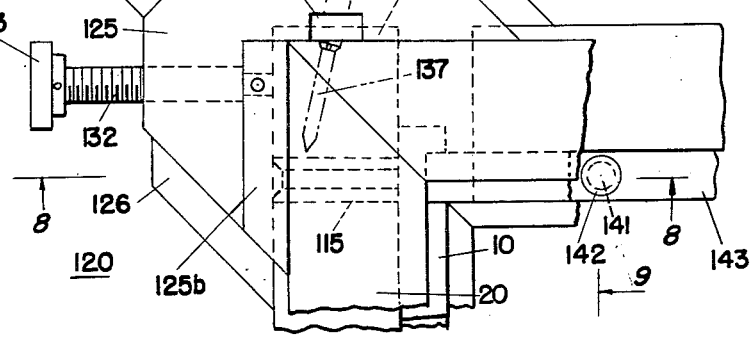

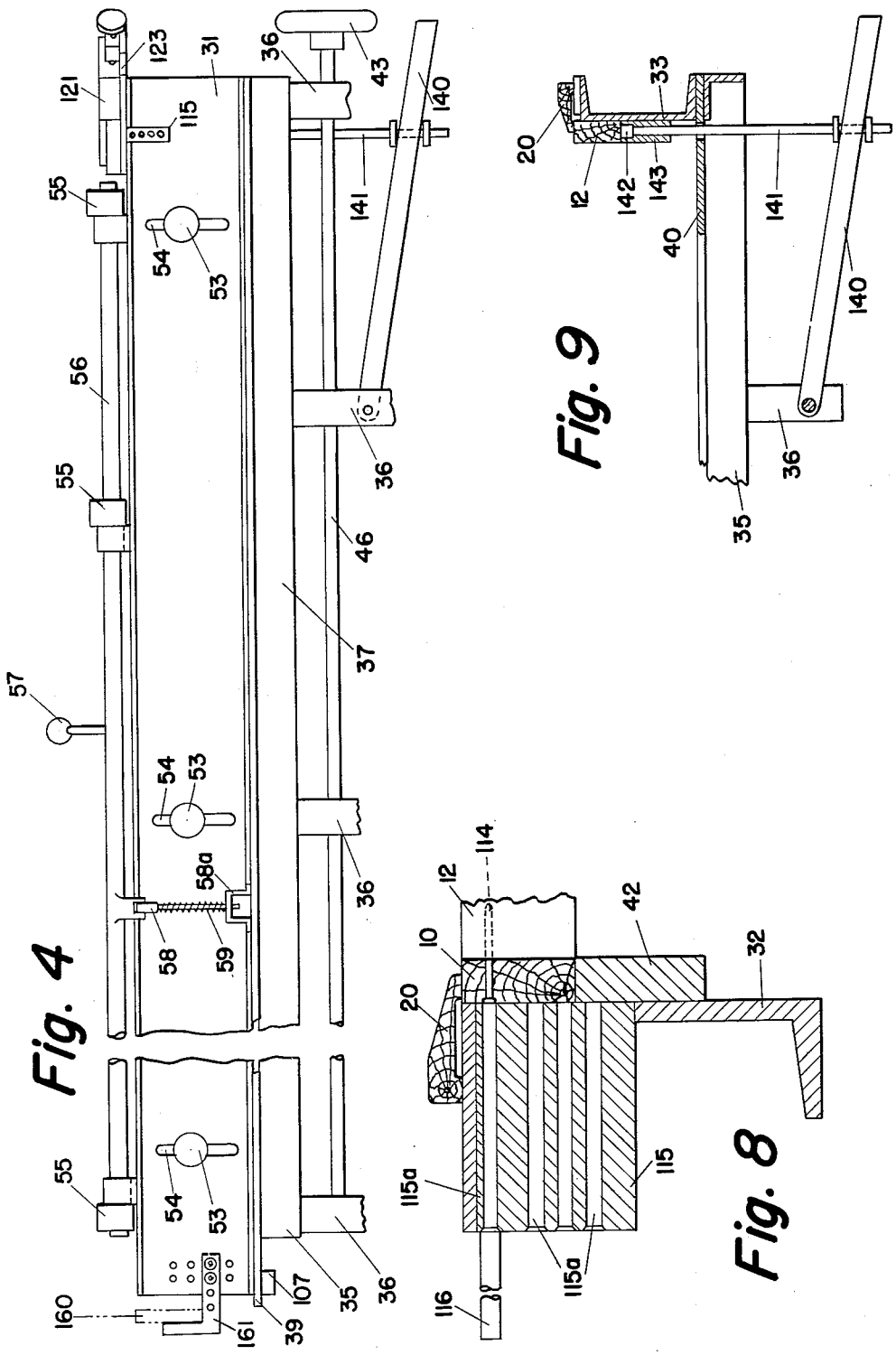

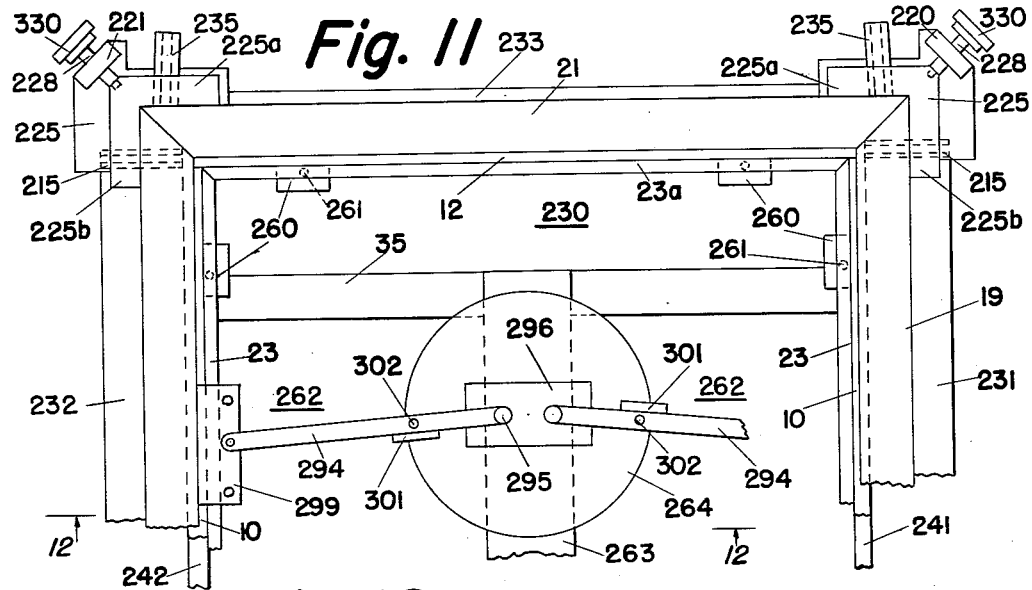
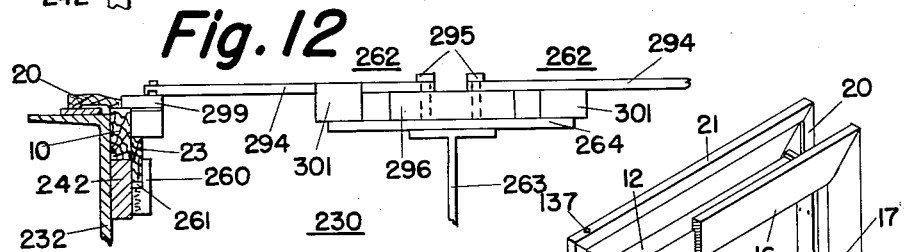
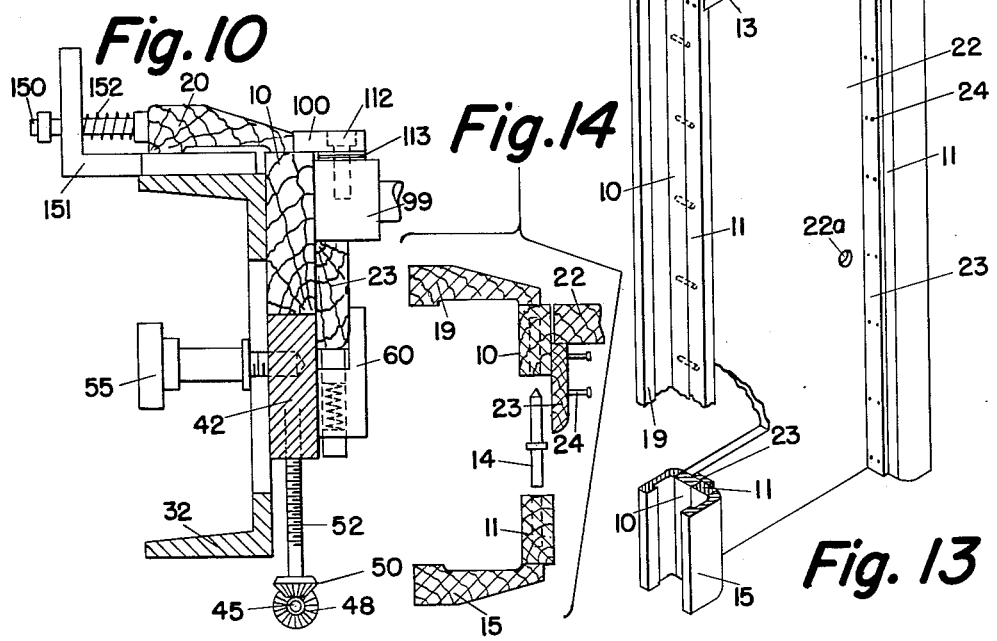

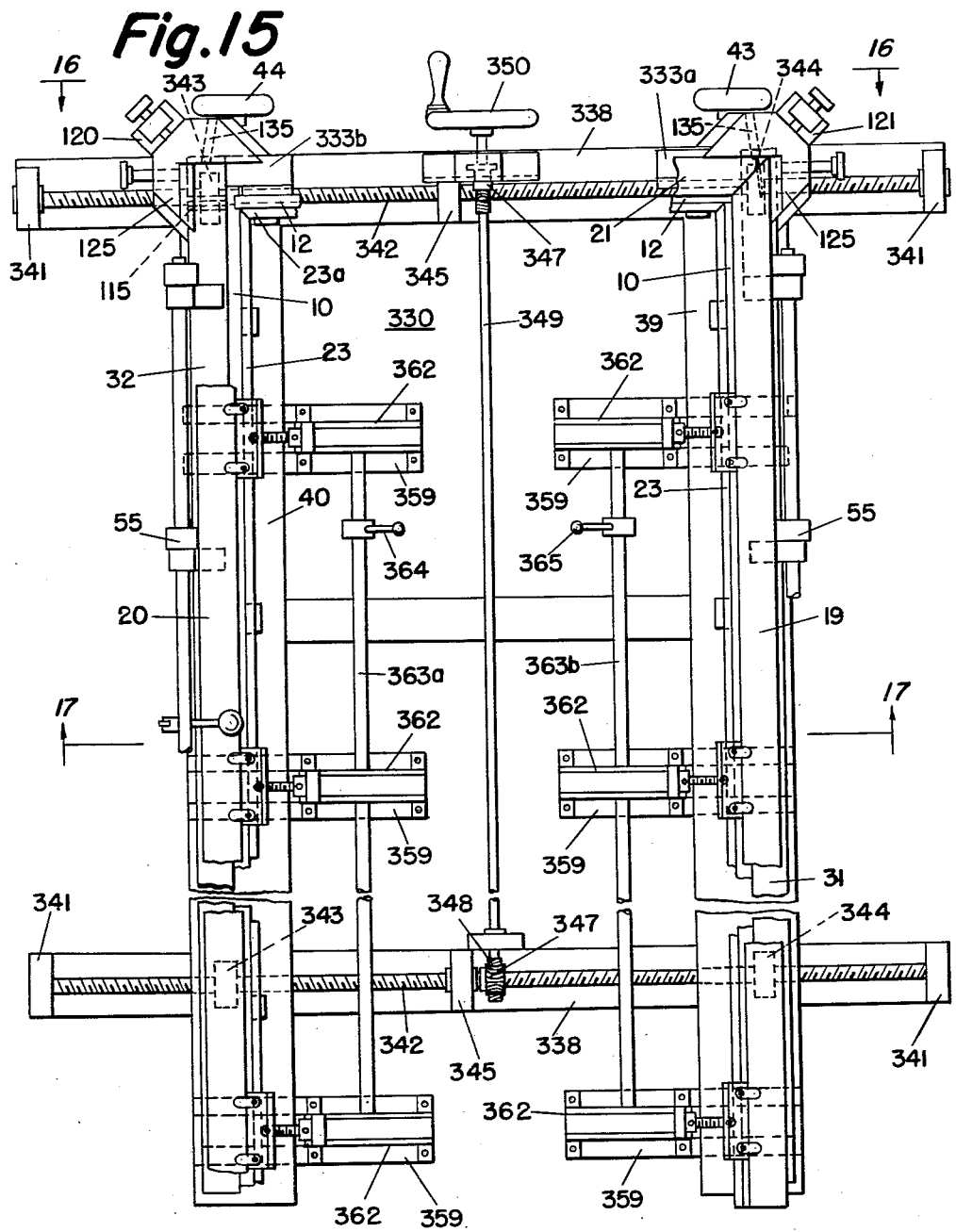

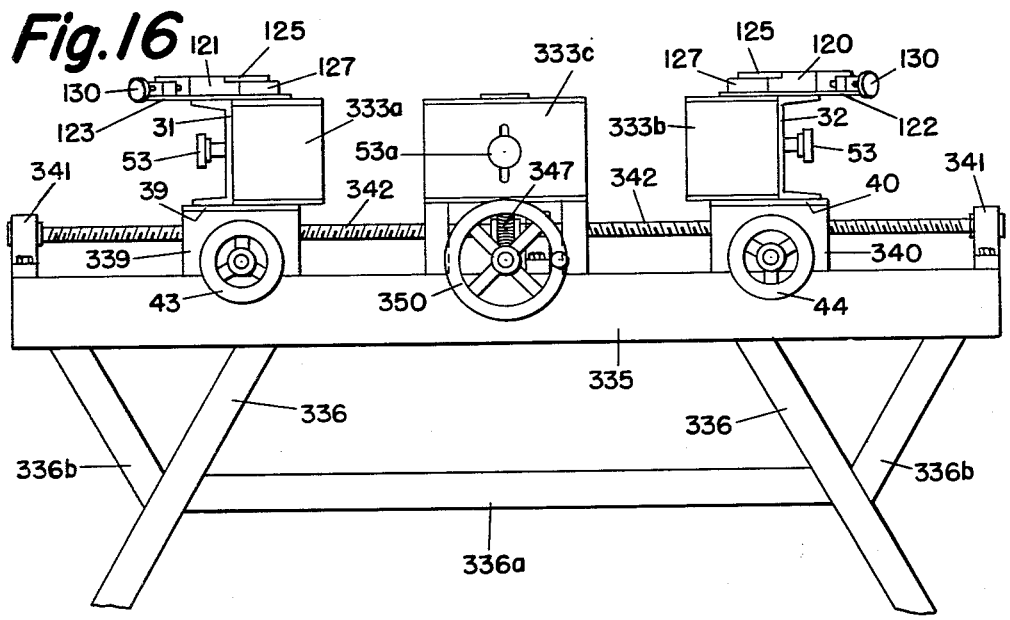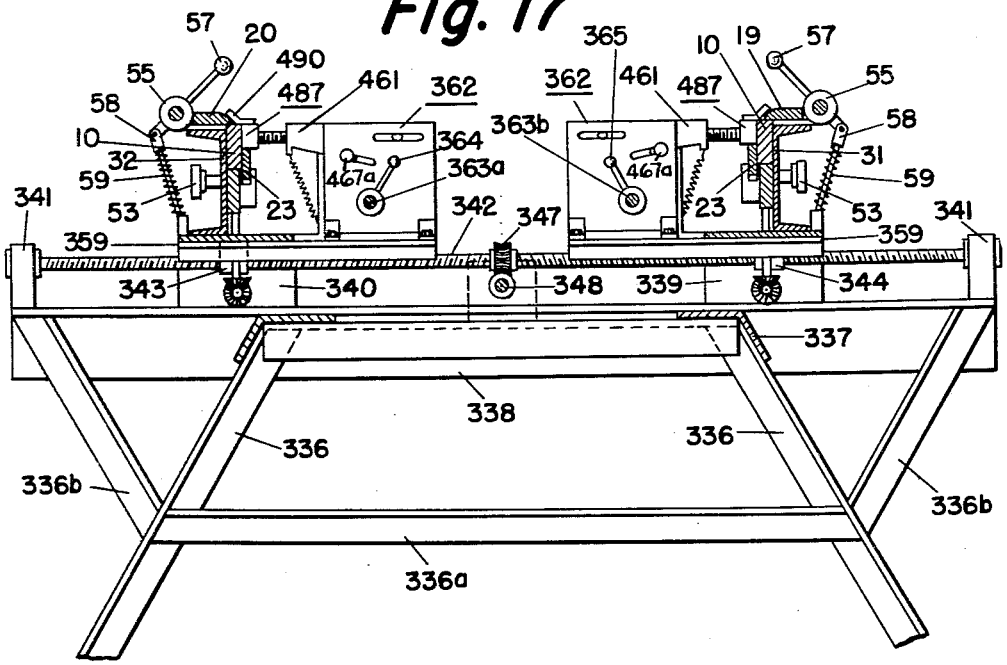

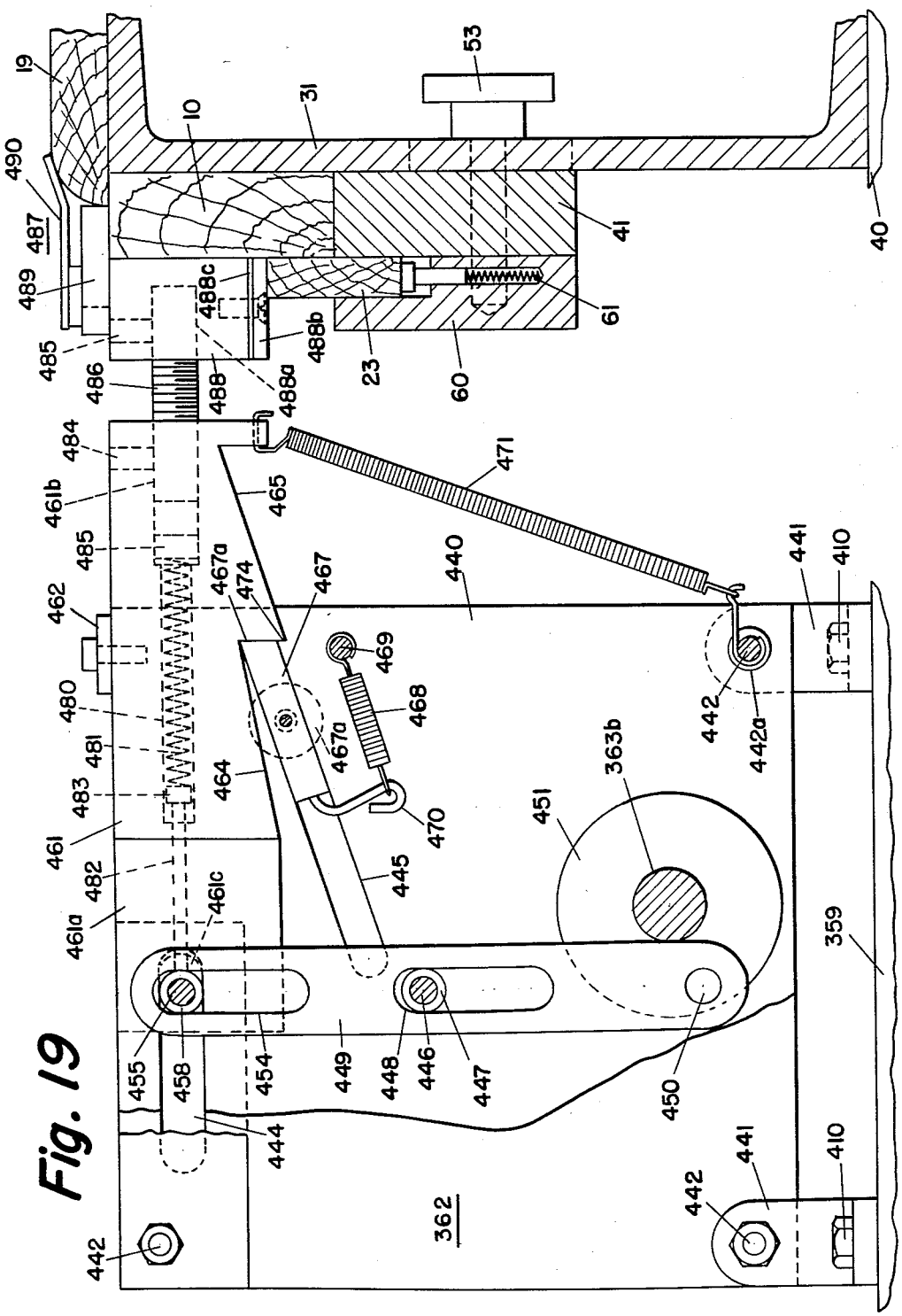

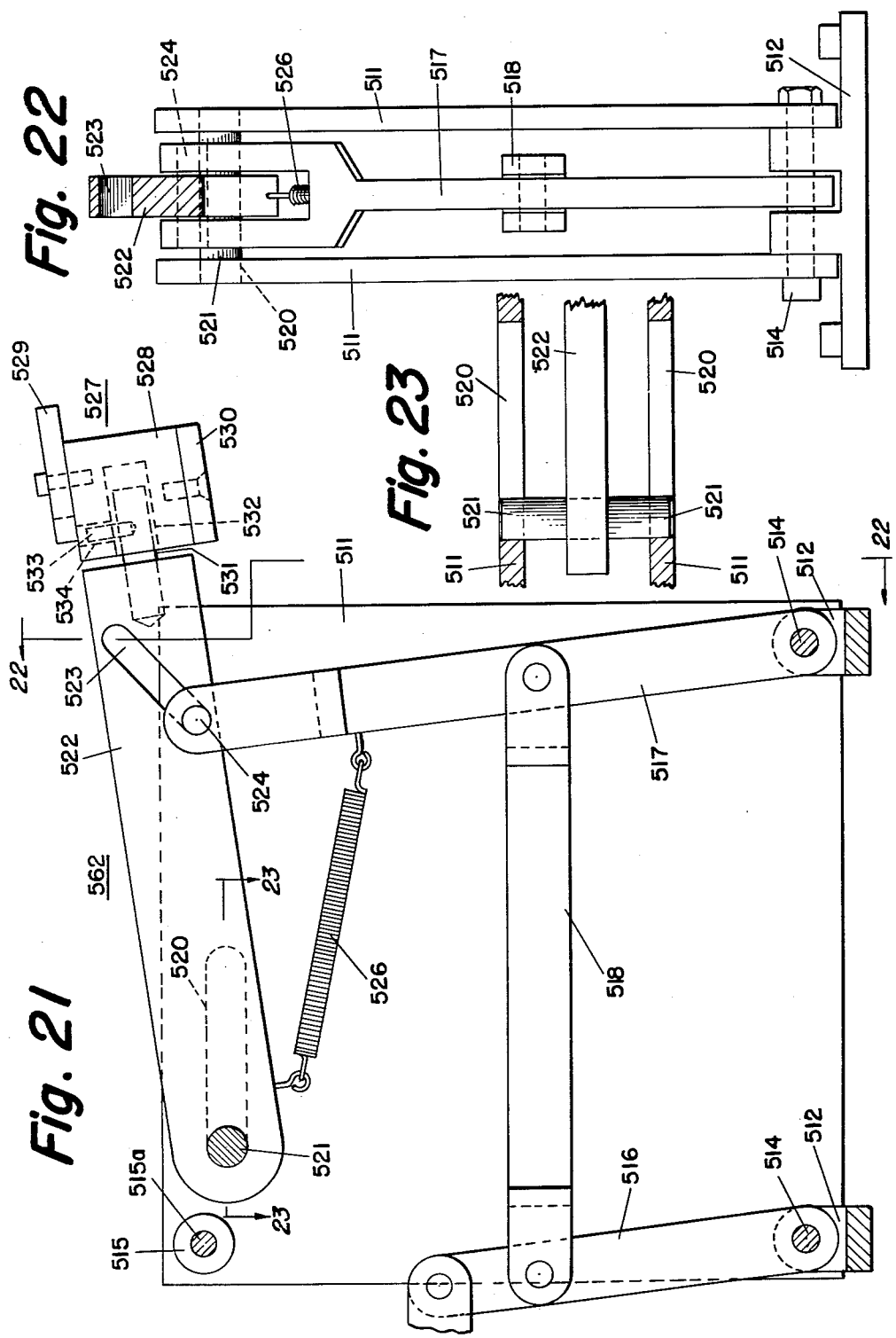

United States Patent Office 3,015,348
Patented Jan. 2, 1962

3,015,348
SYSTEM FOR ASSEMBLING PREHUNG DOORS AND JAMBS
Warren B. Zern, R.D. 3, Pottstown, Pa.
Filed Nov. 17, 1958, Ser. No. 775,093
11 Claims. (Cl. 144—2)

This invention relates to the assembling of prehung doors and jambs and has for an object the provision of methods of and apparatus for enabling door jambs and trim strips to be rapidly assembled into complete door frames for subsequent assembly with doors in the formation of prehung door assemblies.

This application is a continuation-in-part of my earlier filed application Serial No. 627,350, filed December 10, 1956, and expressly abandoned February 10, 1959.

The hanging of doors is an art which ordinarily requires the services of a skilled carpenter to insure that the door will hang properly on its hinges. In order to permit unskilled workmen to install doors in houses and other types of construction, prehung door and frame assemblies have been made available for purchase as complete assemblies. Such assemblies have been relatively high in cost in view of the time required to properly assemble the doors with the jambs and the door trim strips and door stops.

In accordance with the present invention, the time required for assembling a prehung door and frame has been substantially reduced and at the same time it is insured that the jamb members, the trim members and the door stop members will be accurately positioned with respect to each other to provide a completed assembly with the door which is not only produced at a substantial saving both in time and in cost over prior art methods, but insures that the various units of the assembly will be more accurately positioned with respect to each other than if the door and frame had been constructed by hand by a skilled carpenter.

More specifically, the present invention provides a work jig for the manufacture of prehung door and jamb assemblies which includes a support or frame having a pair of side members and an end member disposed to form three sides of a rectangle corresponding to the shape of a door and door casing. The side members have means for supporting a pair of side jambs in spaced parallel face-to-face relation and the end member has means for supporting a head jamb at right angles to the side jambs and in contact with the head ends of the side jambs. The pair of side members each has means for supporting side trim members in overlying relation with the respective side jambs and substantially perpendicular thereto. The end member has means for supporting a head trim member in overlying relation with the head jamb at substantially right angles thereto. The apparatus also includes means for holding the ends of the head trim member in engagement with the adjacent ends of the side trim members preparatory to securing the head trim member to the respective side trim members. A plurality of pressure-applying means are disposed at spaced locations between the pair of side members for concurrently applying force in an outward direction against the side jambs and their respective side trim members to hold the trim and jamb members in engagement in predetermined relation during the assembly of the trim strips with their corresponding jambs. The apparatus further includes means for holding the door stopping strips in predetermined relation with the respective jambs during the assembly operation.

In one form of the invention, the head trim member is held in engagement with the side trim members during assembly by clamping means disposed at each of the corners formed by the head trim and the side trim members. Each of these clamping means comprises a pair of arms at substantially right angles to each other and disposed in a plane parallel to the plane of the frame members with adjustable means for moving the pair of arms along the axis bisecting the angle between the arms. Additional adjustable means is effective on one of the arms for moving it relative to the side trim members without movement of the other arm of the pair. The clamping means also includes structure for guiding a screw into the edge of the head trim member at a location adjacent the junction of the head trim member and a side trim member to secure the trim members tightly together at the joint while the trim members are held in predetermined position by the apparatus and after removal of the assembled door casing from the apparatus.

Further in accordance with the invention there is provided a pressure-applying or clamping mechanism comprising clamping means having a movable arm at the outer end of which there is carried pressure means for applying an outward component of force against the jamb and trim members. The pressure means includes a surface adapted to engage the inner edge of a trim member and the adjacent edge of the jamb and also the inner surface of the jamb to hold the jamb and trim members in predetermined relation during assembly of a door casing. In operation of the clamping mechanism the movable arm is constructed and arranged so as to concurrently move outwardly and upwardly over the edge of the jamb against which the mechanism is to be clamped and then downwardly into engagement with the jamb to hold the latter in predetermined position.

For a more detailed disclosure of the invention and for further objects and advantages thereof, reference is to be had to the following description taken in conjunction with the accompanying drawings in which:

FIG. 1 is a top plan view, with certain parts broken away, showing apparatus embodying the invention for assembling a door casing;

FIG. 2 is an end elevation taken along the lines 2—2 in FIG. 1;

FIG. 3 is an end elevation taken along the lines 3—3 in FIG. 1;

FIG. 4 is a side elevation taken along the lines 4—4 in FIG. 1;

FIG. 7 (sheet 2) is a fractional view showing one of the corner clamping means for the trim strips;

FIG. 8 (sheet 3) is a fractional view, in section, taken along the lines 8—8 in FIG. 7;

FIG. 9 is a fractional view, in section, taken along the lines 9—9 in FIG. 7;

FIG. 10 (sheet 5) is a fractional view, in section, showing a modification of the trim position plungers;

FIG. 11 is a fractional top plan view of a modification of the apparatus embodying the invention similar to FIG. 1;

FIG. 12 is a sectional view taken along the lines 12—12 in FIG. 11;

FIG. 13 is a perspective view, with parts broken away, of a prehung door and jamb assembly assembled by the novel system;

FIG. 14 is an exploded sectional view of the assembly in FIG. 13;

FIG. 15 is a top plan view of another modification of the invention;

FIG. 16 is an end elevation taken along the lines 16—16 in FIG. 15;

FIG. 17 is an end elevation taken along the lines 17—17 in FIG. 15;

FIG. 18 is an elevation view of one of the clamping mechanisms shown in FIGS. 15–17;

FIG. 19 is an elevation view showing the mechanism of FIG. 18 in clamping position;

FIG. 20 (sheet 8) is a sectional view taken along the lines 20—20 of FIG. 18;

FIG. 21 (sheet 10) is a modification of the clamping mechanism shown in FIG. 18;

FIG. 22 is a right end view, partially in section, taken along the lines 22—22 in FIG. 21; and FIG. 23 is a sectional view taken along the lines 23—23 in FIG. 21.

Figure 5:
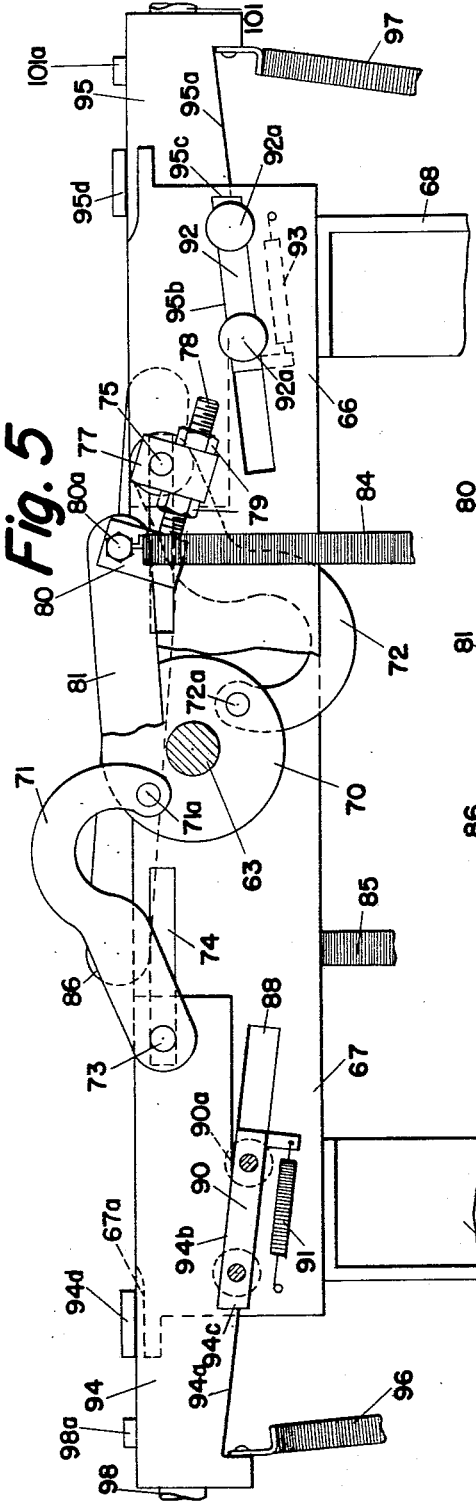
FIG. 5 is a fractional view, with certain parts broken away, of one of the side clamping mechanisms in clamped position.

While the present invention is applicable to various types of door jamb or casing constructions, it is particularly suited for plural-section jamb constructions such as shown in FIGS. 13 and 14 and claimed in my U.S. Letters Patent No. 2,886,860. As may be seen in FIG. 13, the casing or frame for the preassembled door and jamb assembly comprises a plurality of split jamb members. Each of the side jambs comprises a pair of jamb members 10 and 11 and the head jamb comprises a pair of members 12 and 13. The jamb members 10 and 11 of each side jamb are adapted to be secured together by metal dowels 14, as disclosed in my aforesaid copending application. The side jamb sections 11, 11 and the head jamb section 13 are adapted to have secured thereto the respective trim members 15, 16, 17. Corresponding trim members 19, 20 and 21 are secured to the corresponding side jamb sections 10, 10 and head jamb section 12. The trim members are secured to the jamb sections preferably by nailing, as later described. One of the side jamb sections, such for example as section 10, is provided with hinge seat recesses which are adapted to receive hinge plates for supporting a door member 22. The door 22 is provided with an opening 22a adapted to receive suitable hardware, such as a handle and lock not shown. The door is adapted to abut against a stop comprising two side sections 23, 23, FIG. 13, and a head section 23a, FIG. 1, which are adapted to cover the spacing between the split jamb sections. The stop members 23, 23 and 23a are adapted to be secured to their respective sections of the split jamb members as by a plurality of nails 24, FIG. 13.

In constructing a preassembled or prehung door and casing assembly, such as shown in FIG. 11, the side jamb sections are first bored at spaced locations to receive the dowel members for holding the two split sections together throughout their length. As described in my aforesaid copending application, one end of the dowel members preferably is pointed and provided with barbs so that it will have a driven fit within one of the recesses in one of the split jamb sections, for example, section 10. The opposite end of the dowel has a smooth surface so that the two sections 10 and 11 may be readily assembled and disassembled during the initial construction of the door and casing assembly and also during its ultimate assembly into the rough door frame of the building.

After the split jamb sections 10 and 11 have been cut to length and provided with dowel recesses so that the jamp sections may be secured together by the dowels, the jamb is then provided with hinge seats at locations corresponding to the hinge seats at the edge of the door which is to be hung from this jamb. The hinge seats and lock recesses may be quickly and accurately routed in the jamb and the roor by using apparatus of the type disclosed in my Patent 2,801,655 or in Patents 2,605,790, 2,605,791, 2,427,081 and 2,355,603.

After the various parts which make up the door casing, such as the jambs, the trim strips and the stop strips, have been cut to the proper dimensions for the size of door with which they are to be assembled, they are then ready to be assembled by means of the novel system which is now to be described.

Referring to FIG. 1, there is shown one form of apparatus 30 for assembling the casings or frames for the prehung door and jamb assemblies. The apparatus includes a frame having a pair of side members 31, 32, FIGS. 1–3, which are formed from U-shaped channel members. The frame also includes an end member 33 which is adapted to interconnect the upper or head ends of the side channel members 31 and 32, FIGS. 1 and 2. The frame members 31–33 are disposed on three sides of a rectangle corresponding to the shape of a door. The frame preferably is supported in a horizontal position, as shown in FIGS. 2–4, on a table 35. The table 35 preferably is formed from angle irons and includes a plurality of legs 36 which support the side members 37, 37, FIG. 1, and the cross members 38 which comprise the top of the table 35. The side frame members 31 and 32 are disposed on plate members 39 and 40 which in turn are carried by the top of the table 35.

As may be seen in FIGS. 1 and 3, the side trim members 19 and 20 are carried in a horizontal position by the respective channel members 31 and 32. The inner vertical surfaces of the channel members 31 and 32 are adapted to cooperate with adjustable supporting members 41 and 42 respectively for supporting the corresponding jamb sections 10, 10, as shown in FIG. 3. The side jamb supporting members 41 and 42 are adapted to be adjusted by means of the respective handwheels 43 and 44 which are adapted to rotate the respective shafts 45 and 46, the latter being provided with the respective bevel gears 47 and 48, FIG. 3. The bevel gears 47 and 48 cooperate with the respective bevel gears 49 and 50 which in turn are secured to the lower ends of the respectively threaded rod members 51 and 52 which in turn engage the members 41 and 42. When the handwheels 43 and 44 are turned, the respective supporting members 41 and 42 are correspondingly adjusted either up or down depending upon the direction of rotation of the handwheels. When the jambs 10, 10 have been adjusted to their proper relationship with respect to the trim members 19 and 20, the supporting members 41 and 42 may be locked in position by means of the screw type locking devices 53 which are provided with hand knobs, FIGS. 2–4. As may be seen in FIG. 4, the side members of the frame, such as member 31, are provided with slots 54 through which the locking devices 53 extend and thus permit the supporting members 41 and 42 and the respective locking devices 53 to be raised or lowered by operation of the handwheels 43 and 44.

When the side jambs 10, 10 have been adjusted to their proper elevation by the handwheels 43 and 44, the head jamb section 12 is then placed in position in the dado grooves 10a at the head ends of the respective side jamb sections 10, 10, FIG. 1. The head jamb section 12 is supported by an adjustable member on the end member 33 of the apparatus frame similar to supporting members 41 and 42. The trim strips 19, 20 and 21 are then placed in position at substantially right angles to their respective jamb sections 10, 10, 12, as shown in FIGS. 1 and 3. The door stop members or strips 23, 23 are then placed in position on the supports 60 which are carried by the members 41 and 42, FIG. 3. The supports 60 are provided with coil spring plungers 61 which are adapted to bias the stop members 23 in an upward direction as shown in FIGS. 1 and 3, the purpose of which will now be described. The head end section 33 of the frame is also provided with a similar spring support for the stop strip 23a which is adapted to be secured to the head jamb of the door casing. The locking device 53a is adapted to lock the support for the head jamb 12 in its proper position for supporting the head jamb 12 at the same elevation as the two side jambs 10, 10.

Figure 6:
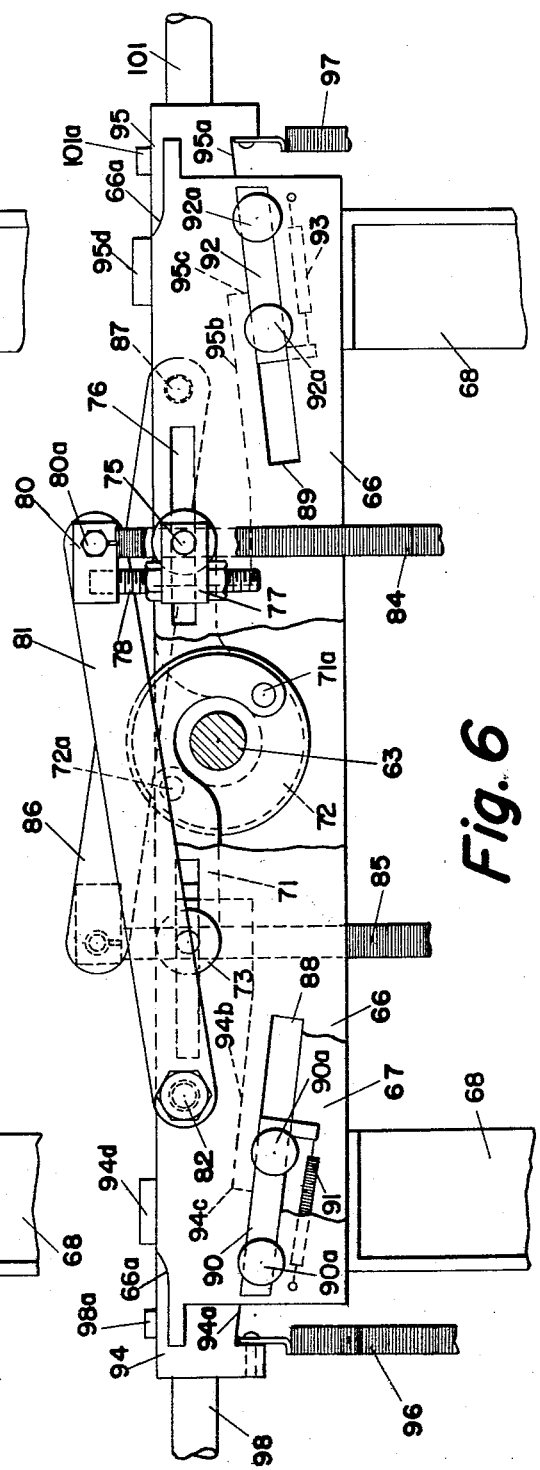
FIG. 6 shows the clamping mechanism of FIG. 5 in the unclamped position.

After the side jambs 10, 10, the head jamb 12, the trim strips 19, 20, 21 and the door stop members 23, 23, 23a have been placed on the apparatus 30, as shown in FIG. 1, the pressure-applying means 62 are operated from their retracted or unclamped position of FIG. 6 to their extended or clamped position of FIG. 5. As shown in FIG. 1, a plurality of the pressure-applying means 62 are employed. There are preferably three or more of the devices 62 spaced along the apparatus 30, as indicated in FIG. 1. The devices 62 are adapted to be operated by a rotatable shaft 63, the latter being adapted to be turned by one of the handwheels 64 or 65.

Each of the pressure-applying means or devices 62 is identical in construction and thus only one will be described in detail. The devices 62, when in their extended position, are adapted to hold the side jambs, the trim strips and the door stop strips in predetermined position relative to each other during an assembly operation. This predetermined position is the one which the jambs, trim strips and door stop strips must assume in order to permit the door to hang properly in the casing when the complete unit is assembled.

Each of the devices 62 comprises a pair of spaced side members 66 and 67, FIGS. 5 and 6, supported on brackets 68 which are in turn carried by the angle irons 38 of the table 35. The operating shaft 63, FIG. 1, extends through the side members 66 and 67, with the latter serving as a bearing for the shaft 63. Between the side members 66 and 67 is a collar member 70 which is secured to the shaft 63. Connected to the collar 70 at opposite sides thereof is a pair of hook-shaped operating levers 71, 72, FIG. 5. The straight end of the lever 71 is provided with a projection or pin 73 which is adapted to extend through a slot 74 in side member 67 and into a slidable arm 94. Lever 72 has a similar projection 75 which extends through a slot 76 in side member 66 and into a slidable arm 95. Pivotally connected to the projection 75 is a block 77 through which there extends a threaded element 78, the position of which is adjustable. The threaded member 78 is adapted to be locked in position after adjustment by means of a pair of locking nuts 79 disposed on opposite sides of the block 77. One end of threaded member 78 is adapted to threadedly engage another block 80 which is pivotally carried at one end of a link 81. The opposite end of link 81, FIG. 6, is pivoted at 82 to the side member 66. As may be seen in FIGS. 3, 5 and 6, the block 80 is biased toward the table 35 by means of a tension spring 84 which is connected to the table 35 and to pivot 80a for the block 80. A similar block arrangement (77–80) is connected to the projection 73 of lever 71 for operation by a tension spring 85 which is connected to a link 86 which is pivoted at 87 to the other side member 67. The springs 84 and 85 are effective through their respective linkages to hold the arms 94 and 95 in either their extended positions, FIG. 5, or their retracted positions, FIG. 6.

Each of the side members 67 is provided with a pair of inclined slots 88 and 89. The pair of slots 88, 88 is adapted to carry a slidable member 90 which is biased toward the outer ends of slots 88, 88, FIG. 5, by means of a pair of tension springs 91, 91. The member 90 is held within the slots 88, 88 by guides 90a, FIGS. 5 and 6. One end of each spring 91 is connected to the slidable member 90 and each of the other ends of the spring 91 is fixed to the stationary side members 66 and 67. A similar arrangement is provided in connection with slots 89, 89 where a member 92 is slidably carried and biased to its outward position by means of a pair of springs 93, 93 which have one of their ends connected to the member 92 and their opposite ends connected to the stationary side members 66 and 67. As may be seen in FIGS. 5 and 6, the members 90 and 92 have flat upper surfaces on which are adapted to slide the respective arms 94, 95. The arms 94 and 95 have a pair of lower surfaces 94a, 94b and 95a, 95b which are inclined at the same angle as the corresponding slots 88 and 89. The surfaces 94a and 94b are separated by a step 94c and the surfaces 95a and 95b are separated by a step 95c.

When the device 62 is in its retracted position, as shown in FIG. 6, the inclined surface 94a rests on the upper surface of member 90 and the inclined surface 95a rests on the upper surface of member 92. To move the device 62 to its extended or clamping position, FIG. 5, one of the handwheels 64 or 65 is rotated to turn the shaft 63 and collar 70 in a counterclockwise direction, as viewed in FIG. 6. During this rotation, the hook-shaped operating levers 71 and 72 are rotated about the shaft 63 so that their pivotal connections 71a and 72a to the collar 70 are rotated through an angle of approximately 180° from the position of FIG. 6 to the position shown in FIG. 5. This movement unwraps the hooked ends of levers 71 and 72 from around shaft 63 and causes the connections 73 and 75 with the arms 94 and 95 to move outwardly until the step portions 94c and 95c of the respective arms reach the outermost ends of the respective members 90 and 92, at which time the arms 94 and 95 drop downwardly under the bias of tension springs 96 and 97. The springs 96 and 97 are respectively connected to the table 35 and to the arms 94 and 95. When the arms 94 and 95 move outwardly, as above described, it will be noted that they concurrently move upwardly by reason of the incline at which the members 90 and 92 are disposed. The purpose of this action will now be described.

At each of the outer ends of the arms 94 and 95 is disposed an extension member 98 at the outer end of which is carried a pair of pressure members 99 and 100, FIG. 3. The pressure members 99 and 100 are disposed at substantially right angles to each other, as may be seen in FIG. 3. The pressure member 99 has been shown in the form of a block with its lower surface adapted to engage the upper surface of stop member 23, and the outer surface of member 99 is adapted to engage the inner vertical face of the jamb member 10. The pressure member 100 likewise performs two functions with its lower surface adapted to engage the uppermost surface of jamb 10 and the outer vertical surface of member 100 being adapted to engage the inner edge of trim strip 20. The arm 95 likewise is provided with a similar extension 101, the outer end of which is provided with pressure-applying members 102, 103 which are adapted respectively to engage the stop member 23, the jamb 10 and the trim strip 19, as shown in FIG. 3.

When the device 62 is moved from its retracted position of FIG. 6 to its extended position of FIGS. 5 and 3, the pressure-applying members 99, 100, 102, 103 are moved outwardly by springs 84, 85 and downwardly by springs 96, 97 against the respective trim strips, jamb sections and door stop members. The extensions 98 and 101 are so adjusted that the jamb-engaging surfaces of members 99 and 102 will be spaced apart a distance corresponding to the width of the door to be assembled in the prehung unit plus the desired clearance between the door and the side jambs. The vertical dimension between the lower surfaces of members 100 and 99 and between the lower surfaces of members 102 and 103, as viewed in FIG. 3, will determine the thickness of the door to be assembled in the unit, FIG. 14.

When the step portions 94c and 95c move off of their respective supporting members 90 and 92, the arms 94 and 95 move downwardly under the bias of springs 96, 97 to bring the respective pressure-applying members 100 and 103 into engagement with the upper edges of the jambs 10, 10 and force the lower edges of the jambs against their supports 41, 42. This insures that the jambs will be straight on their supports. The other pressure-applying members 99 and 102 engage the stop members 23 and move them to their correct positions relative to the jambs 10, 10 as the stop members 23, 23 are supported on the spring-biased plungers 60. It is to be noted, FIG. 5, that the saddle members 94d and 95d which are carried by the respective arms 94 and 95 do not engage the stationary members 66 and 67 at this time. The saddle members 94d and 95d are adapted to engage the stationary members 66 and 67 when the clamping devices 62 are retracted as later to be described.

The present invention is applicable to handling doors and door casings of various sizes, for example, doors of various widths from two feet to three feet and of different lengths as well as different thicknesses. No adjustment need be made in the apparatus, as shown in FIGS. 1–4, for doors of different lengths. To accommodate doors of different widths, the side members 31 and 32 of the frame may be moved relative to each other after first loosening the knobs 104, 104 and 105, 105 at the respective ends of the apparatus. As may be seen in FIGS. 1 and 3, the knobs 104 at the lower end of the apparatus are adapted to control threaded members 106, the lower ends of which are conical shaped and adapted to be received in the conical or countersunk recesses disposed in members 107 which are in turn secured to the respective supporting plates 39 and 40 for the side members 31 and 32. The recesses in the members 107 are disposed at uniform distances apart, for example, one inch. Thus, when the side members 31 and 32 are moved toward each other to their innermost positions, the threaded members 106 will engage the recesses 107b in the members 107 at their outermost ends. This position will correspond to the position of the apparatus for the assembly of a door two feet wide. As may be seen in FIGS. 1 and 3, the members 107 are each provided with seven recesses and thus will accommodate doors varying in thickness by two inch increments and when the inner recesses 107a of members 107 are in alignment with the threaded members 106, the apparatus will be adjusted for doors three feet in width. Corresponding adjustment is made of the knobs 105 at the head end of the door, FIGS. 1 and 2, which are adapted to control the engagement of the threaded members 108 with the corresponding recesses 109a—109b in members 109 which are connected to and movable with the side frame members 31 and 32 of apparatus 30. The threaded members 108 at the head end of the apparatus are carried by the frame section 33 which is stationary and is fixed to the table 35. The threaded members 106 at the foot end of the apparatus 30 are carried by the brackets 110 which are also secured to the table 35. By providing the ends of threaded members 106 and 108 with tapered or conical surfaces which cooperate with correspondingly tapered recesses in respective members 107 and 109, it is assured that the side frame members 31 and 32 will be moved quickly and accurately into their proper aligned positions for the selected width of door. The clamping devices 62 are adjustable in length for different widths of doors by means of the set screws 98a and 101a which extend through the arms 94 and 95 and engage spaced recesses in the adjustable extension members 98 and 101 respectively.

To accommodate doors of different thickness, the pressure members 100, FIG. 10, are adapted to be secured to the pressure members 99 by screws 112. With this arrangement, the members 99 and 100 may be separated a predetermined distance as by varying the spacers or washer members 113. For doors of greater thickness, additional washers 113 will be inserted between the pressure members 99 and 100, thus increasing the spacing between the lower surface of pressure member 100 and the lower surface of pressure member 99. Also, this adjustment may be accomplished by screwing an additional plate to the bottom of member 99 and inserting the shim washers therebetween. These adjustments will control the spacing between the door stop 23 and the trim-engaging edge of the jamb section 10 to correspond with the thickness of the door, FIG. 14, to be assembled in the prehung door and jamb unit. A similar arrangement is provided for adjustment of pressure members 102 and 103.

After the jamb pressure-applying means 62 have been moved to their outermost or clamped positions, as shown in FIGS. 1, 3 and 5, the head jamb 12 is ready to be assembled with the side jambs 10, 10. As may be seen in FIG. 1, the head jamb 12 is adapted to have its ends received by the dado grooves 10a at the respective head ends of the side jambs 10, 10. Each of the side members 31 and 32 at the head end of the apparatus 30 is provided with a nailing block 115, FIGS. 1, 4, 7 and 8, which is adapted to guide the nails through the side jambs 10 and into the ends of the head jamb 12. A nailing punch 116, as shown in FIG. 8, preferably is used to drive the nails 114 through the nail-receiving passages 115a in nailing block 115.

As may be seen in FIGS. 1, 3 and 10, the side trim strips 19 and 20 are adapted to be held in position against the edges of the respective pressure members 103 and 100. The members 103 and 100 are adjustable transversely of the apparatus and serve the additional function of gauge blocks in determining the amount of overlap of the respective trim strips 19 and 20 with their corresponding side jamb sections 10, 10. To force the side trim strips 19 and 20 against the respective blocks 103 and 100 carried by the plurality of pressure-applying devices 62 which extend lengthwise of the apparatus 30, there is provided a spring-biased clamping means which is adapted to engage the outer edges of the trim strips 19 and 20. In a preferred embodiment shown in FIGS. 1, 3 and 4, the spring-biased clamping means for the side jambs includes a plurality of cams 55 which are carried by rods 56 which extend along each of the side frame members 31 and 32 of apparatus 30. The cams 55 are adapted to be biased into engagement with the edges of the trim strips 19 and 20 by moving the operating handle 57 from its phantom line position, FIG. 3, to its full line position, the latter being the over-center position for the pivoted member 58 which is biased by means of a spring 59 which surrounds member 68 and is compressed between a shoulder on member 58 and a bracket 58a on table 35 which pivotally receives the lower end of member 58. As may be seen in FIGS. 1 and 4, the operating handles 57 are adapted to rotate the rods 56 and thus all of the cams 55 on each rod are concurrently moved into and out of their respective clamping positions. The cams 55 are disposed in an off-center position with respect to the axis of the rods 56 and thus are adapted to apply components of force to the respective trim strips 19 and 20 in both transverse and downward directions, as viewed in FIG. 3. Thus, the trim strips 19 and 20 are held tightly against their respective horizontal supports and also against their respective locating blocks 100 and 103. This keeps the trim strips straight during assembly.

To clamp the trim strips 23 and 23a together at the head end of the door frame, the apparatus is provided with a pair of trim miter clamps 120 and 121 disposed at the respective corners at the head end of the apparatus. The clamps 120 and 121 are essentially identical with the exception that one is for the left-hand corner while the other is for the right-hand corner. As may be seen in FIGS. 1, 2, 4 and 7, the trim clamps 120 and 121 are carried by the respective trim plates 122 and 123 which in turn are supported in a horizontal position by the upper surfaces of the respective side frame members 32 and 31, FIG. 2. Referring to FIGS. 1, 2 and 7, each of the trim clamps 120 and 121 includes a clamping member 125 which is adapted to slide on the trim plate between a pair of guide blocks 126 and 127 which project above the trim plate 122. The clamping member includes a pair of arms 125a and 125b, FIG. 7, disposed at substantially right angles to each other. The clamping member 125 is adapted to be moved along a line which forms a 45° angle with respect to the side trim strips 19 and 20 and the head trim strip 21. The movement of the clamping member 125 is provided by means of the rotatable threaded member 128 which extends through the stationary support 129 and is rotatably carried at one end by the clamping member 125. The outer end of threaded member 128 is provided with a knob 130 for adjustment. By rotating knob 130, the clamping member 125 may be moved along the line which bisects the angle formed between the head trim strip and a side trim strip concurrently to adjust the arms 125a and 125b relative to the head trim strip 21 and the side trim strip 20, FIG. 7. It will be seen that the arm 125b is also adjustable separately from arm 125a by means of the threaded member 132 which extends through the side of clamping member 125 and is operable by a knob 133. With the foregoing arrangement, the side trim strips 19, 20 and the head trim strip 21 can be clamped in their proper positions relative to each other preparatory to securing the trim strips together.

One of the most difficult jobs in assembling a door casing is to assemble the head trim strip with the adjacent side trim strips so that the joint will be tight and provide a good appearance. In accordance with the present invention, provision is made for clamping the trim strips in their respective positions and then securing the trim strips together at each of the joints by means of screws extending through the sides of the trim strips. As may be seen in FIG. 7, the clamping member 125 is provided with a passageway 135 which extends through the arm 125a and intersects the notch 136. The passageway 135 provides a guide for drilling a screw-receiving recess in the corner of the trim strips and also provides a guide for the screw 137, FIG. 7, when it is inserted into the joint formed by the head trim strip 21 and the side trim strips 19 and 20. The notch 136 permits the operator to see the drill bit when it enters the head trim strip 21 and also permits the operator to see the screw head and the screwdriver during the assembly operation. As may be seen in FIG. 7, guide 135 extends at an angle with respect to the side trim strip 20 so that the screw 137 will enter the trim strip 20 at an angle with respect to the grain of the wood and thus permit the threads on the screw to obtain a better grip on the side trim strip. The foregoing arrangement permits the trim strips to be tightly secured together at their corners and prevents them from coming apart when the prehung door assembly is handled both prior to and during installation in the rough door frame of a building as frequently occurs when the trim strips are secured together by nails.

While the pressure-applying means 62 are in their extended or clamped positions, as shown in FIGS. 1 and 3, the door stop strips 23, 23 and 23a are secured in their respective positions as by nailing. With the section of the door casing including the jamb sections 10, 10, 12, the trim strips 19, 20 and 21 and the door stop members 23, 23 and 23a all secured together to form a unit, this assembled unit is then ready to be removed from the apparatus 30. To accomplish this, the operating handles 57 for the side trim strips are moved to their unclamped position as shown in phantom lines in FIG. 3 and the trim miter clamps 120 and 121 are withdrawn from the respective corners of the trim strips. The handwheels 64 and 65 are rotated in a clockwise direction as viewed in FIGS. 1 and 3 to move the clamping devices 62 to their unclamped or retracted positions against the bias of springs 84 and 85, as shown in FIG. 6. When the clamping devices 62 are moved from their clamping position, FIG. 5, to their unclamped position, FIG. 6, the arms 94 and 95 are drawn inwardly against the respective spring-biased slidable members 90 and 92. For example, arm 94 moves inwardly toward the operating shaft 63 with the step 94c forcing the slidable member 90 inwardly and downwardly along the slot 88 against the bias of spring 91. This action continues until the member 90 has been moved to a position which is lower than the step 94c, at which time the member 90 springs back to its position shown in FIG. 6 and permits the surface 94a to engage the upper surface of member 90. At this time the saddle 94d has moved up the inclined slope 66a and 67a until the saddle 94d rests on the flat upper edges of members 66 and 67, as shown in FIG. 6. It is to be understood that arm 95 is concurrently moved with arm 94 and cooperates with slidable member 92 and spring 93 in a similar manner so that in the unclamped position, FIG. 6, the member 95d will again rest on the flat upper edges of members 66 and 67.

The preassembled section of the door casing is then removed from the apparatus 30 by grasping the levers 140, FIGS. 2, 4 and 9, and moving them upwardly. The levers 140 are pivoted at one end to the table frame 36, FIG. 4. Intermediate the ends of the levers 140 is slidable connection with a vertical knock-out rod 141 which is adapted to extend through the adjustable head jamb support 143 carried by the end section 33, FIG. 9. The upper end of knockout rod 141 is provided with an enlarged head member 142 which is adapted to engage the lower edge of the head jamb 12. When the levers 140 are raised, the respective knockout rods 141 will engage the head jamb 12 and move the assembled section of the door casing upwardly from the apparatus 30 where it may readily be removed in its properly assembled position. To insure that the assembled parts of the casing do not move out of their properly assembled relation during the removal from the apparatus and prior to installation in a rough door frame of a building, a tack strip is temporarily secured across the bottom ends of the side jamb. A tack strip or board 160 has been shown in phantom in FIG. 4 supported on adjustable brackets 161 carried by each of the side frames 31 and 32 of apparatus 30.

While the foregoing description has been concerned with the section of the door casing which includes the hinge-receiving jamb 10 with the door stop 23, FIG. 14, it will be seen that the other section of the door casing which comprises the jamb members 11, 11 and 13 and the trim strips 15, 16 and 17, FIGS. 13 and 14, is adapted to be assembled in the same manner as the section previously described and which included the jamb sections 10, 10 and 12 and trim strips 19, 20 and 21 and door stop members 23, 23 and 23a. The only difference in the assembly is that the second section of the door casing does not include the door stop members.

A modification of the spring-biased clamping members for the side trim strips is shown in FIG. 10. In this modification the clamping means comprises a plurality of plungers 150 which are adapted to extend through side brackets 151 carried at spaced locations by the respective side frame members 31 and 32 of apparatus 30. The plungers 150 are biased toward the trim strips by coil springs 152 which surround each plunger 150. The plungers 150 are adapted to engage the outer edges of the respective side trim strips and force the inner edges against the locating members 100 and 102.

Another modification of the invention is shown in FIGS. 11 and 12. However, a preferred form has already been described in connection with apparatus 30 shown in the earlier figures.

The apparatus 230 shown in FIGS. 11 and 12 comprises a pair of side channel members 231 and 232 and interconnected at their head ends by a third channel member 233. The channel members 231–233 are supported in a horizontal position on a table 35 or other similar support. The members 231 and 232 are adapted to support the side jamb strips on adjustable supporting members 241 and 242. The members 241 and 242, in turn, are adapted to support the side jamb members 10 in the proper relationship with respect to the trim strips 20 and 19 which are supported on the upper surfaces of the frame members 231 and 232. The supporting members 241 and 242 are adjustable to move the side jambs 10 to their required elevation in a manner similar to that previously described in connection with the corresponding supports 41 and 42 in apparatus 30. The end channel member 233 is similar in construction with the side members 231 and 232 and provides the support for the head jamb 12 and the head trim strip 21. As may be seen in FIGS. 11 and 12, the apparatus 230 also includes supporting structure 260 for the stop members 23, 23 and 23a. The structure 260 includes spring-biased plungers 261 to provide a spring support for the stop members.

At the head end of the apparatus 230 are a pair of miter clamps 220 and 221. These clamps include a movable clamping member 225 having arms 225a and 225b disposed at substantially right angles to each other to engage the head and side trim members adjacent the joint formed therebetween. The clamping members 220 and 221 are adapted to be operated by the knobs 330 which are connected to screw members 228, the latter being connected to the clamping members 225 to move them along an axis which bisects the angle formed between the arms 225a and 225b. The arms 225a arm provided with a guide 235 for guiding a drill in boring a pilot hole for the screw which is to be inserted through the joint formed between the head trim strip and the respective side trim strips. Each of the side frame members 231 and 232 is provided with a nailing block 215 for guiding the nails through the side jambs 10 and into the ends of the head jamb 12.

To clamp the side jambs 10, 10, the side trim strips 19 and 20 and the side stop members 23, 23 in predetermined relative positions along the side channel members 231 and 232, there are provided a plurality of pressure-applying devices 262 disposed along the length of the apparatus 230. The devices 262 are supported on an I-beam 263 which in turn is carried by the table which supports the apparatus 230. The I-beam 263 in turn supports a circular plate 264 on which the pressure-applying devices 262 are carried. Each of the devices 262 comprises an arm 294 which is pivotally carried at one end by a pivot 295 which extends through a block 296 projecting above the supporting plate 264. At the outer end of arm 294 are pressure members 299 and 300 which are adapted to engage the inner edge of the trim strips 20, the upper and inner faces of the side jamb members 10 and also the upper edge of the stop member 23 as shown in the sectional view, FIG. 12.

While only two of the pressure-applying devices 262 have been shown in FIG. 11, it is to be understood that a plurality of these will ordinarily be employed, for example, four of them on each side of the I-beam 263, making a total of eight pressure-applying devices 262 for holding the side jambs, side trim strips and side stops in their proper relationship with respect to each other. The devices 262, as shown in FIG. 11, are operated separately to move the pressure-applying members 299 and 300 into clamping position, as shown in FIG. 11. To move them out of clamping position, the arms 294 are rotated toward the I-beam 263 until the pivoted members 299 and 300 are disengaged with respect to the side jambs 10. To support the devices 262 when they are out of engagement, or in their unclamped position, the arms 294 are provided with a projection or shoe 301 which extends downwardly from the arm and is adapted to slide on the circular plate 264. The shoe 301 is secured to arm 294 as by a screw 302.

The various parts of the door casing including the jambs, the trim strips and the door stops are secured together in the same manner as previously described in connection with apparatus 30, as shown in FIG. 1. After the parts of the door casing have been assembled, the assembled unit is then removed from the apparatus 230 and the second half of the door casing is then assembled. The two halves of the casing are then adapted to be assembled together as a unit similar to the unit indicated in FIGS. 13 and 14 with a door hung on the jamb.

As previously mentioned, a preferred embodiment of the invention is that described and illustrated in the form of apparatus 30, FIG. 1, as it includes numerous automatic and adjustable features which enable a door casing to be assembled in substantially shorter time than with the apparatus 230 shown in FIGS. 11 and 12. However, both the apparatus 230 and apparatus 30 provide a substantial saving in time over prior art methods of assembling prehung door and jamb assemblies. The apparatus 230 is not adjustable in width and thus if doors of two different widths are to be assembled, it is necessary to provide a device 230 corresponding in width to each of the doors. As pointed out above, this is not necessary in the preferred embodiment of the invention as apparatus 30 is adjustable to pre-assemble door and jamb units of various widths within predetermined limits. For ease in adjusting the over-all length of the clamping devices 62 in apparatus 30 to correspond to doors of different widths, the extension rods 98 and 101 preferably are provided with recesses to receive the set screws 98a and 101a. The recesses are spaced apart a distance corresponding to the spacings between the recesses in the members 107 and 109 on the frame of the apparatus. This insures that the clamping devices 62 will be correctly and correspondingly adjusted for the different widths of doors.

As previously described, the split jamb sections 10 and 11 are preferably secured together by means of the metal dowels 14 shown in FIGS. 13 and 14. The dowels may be driven into the male jamb prior to placing the male jamb in the jig 30. The supports 41 and 42 for the side jamb members are provided with recesses at spaced locations corresponding to the locations of the dowels in the jambs. Thus when a male jamb is placed on the supports 41 and 42 the dowels will extend into the recesses and the jamb will sit flush on the upper surface of members 41 and 42. When the dowels are inserted in the jambs they also provide a means for preventing the jambs 10 from being moved lengthwise of the apparatus 30 during the assembly operation. When a female jamb 11, i.e. one without dowels, is placed on the supports 41 and 42, a dowel may be temporarily inserted in one of the bores in the jamb 11 to act as a pilot and thus prevent movement of the jamb 11 lengthwise of the jig during an assembly operation. This dowel is then removed from the jamb 11 after the section of the door casing has been assembled.

Referring to FIGS. 15-20, there is shown another preferred embodiment of the invention. As may be seen in FIG. 15, there is shown an apparatus 330 for assembling the casings or frames of prehung door and jamb assemblies similar to the apparatus 30 previously described in detail. Since the apparatus 330 includes numerous parts which are the same and operate in the same manner as those previously described in connection with apparatus 30, these parts have been identified with the same reference characters. The apparatus 330 includes a frame having a pair of side members 31 and 32, FIGS. 15-17, which are formed from U-shaped channel members. The frame also includes a pair of end members 333a and 333b which are channel-shaped and secured at right angles to the respective side members 31 and 32. A stationary end member 333c is disposed between members 333a and 333b. Thus, it will be seen that the frame members 31, 32, 333a, 333b and 333c are disposed on three sides of a rectangle corresponding to the shape of a door. The frame preferably is supported in a horizontal position, as shown in FIGS. 15-17 on a table 335. The table 335 preferably is formed from angle irons and includes a plurality of legs 336 which support the side members 337, FIG. 17, and the cross members 338 at the opposite ends of the table 335. The legs 336 are interconnected at their midpoints by an angle member 336a and arranged in the shape of an A frame. It will be noted that the cross members 338 extend on either side of the A frame structure and additional brackets 336b are provided to support the outer ends of cross members 338. The side frame members 31 and 32 are secured to the upper surface of plate members 39 and 40 which in turn are supported on blocks 339 and 340. The supporting blocks 339 and 340 are disposed at the opposite ends of plates 39 and 40 and are adapted to slide across the upper surfaces of the cross members 338.

The outer ends of cross members 338 are adapted to receive the corresponding ends of cross rods 342. The cross rods 342 are provided through half their length with left-hand threads and through the other half of their length with right-hand threads. These threaded portions of cross rods 342 are adapted to be engaged by threaded nut members 343 and 344, FIG. 17, with corresponding left-hand and right-hand threads. The nut members 343 and 344 in turn are secured to the plate members 39 and 40 which carry the respective side frame members 31 and 32. The intermediate portions of the cross rods 342 are provided with bearing supports 345, FIG. 15, adjacent to which are worm wheels 347 which are secured to the cross shafts 342. The worm wheels 347 are adapted to be driven from worm members 348 which are carried by a drive shaft 349. The outer end of drive shaft 349 is provided with a hand wheel 350 which is adapted to be turned by the operator to adjust the spacing between the side frames 31 and 32 so that the apparatus 330 may be readily adjusted for assembling casings for prehung door and jamb assemblies of different widths. By merely turning the hand wheel 350 both of the side frames 31 and 32 are concurrently adjusted. For example, it will be assumed that the apparatus 330 has been set for assembling door frames for doors which are thirty-two inches wide. To change the apparatus 330 for assembling door frames which are to be used with doors thirty-four inches in width, it is only necessary to turn the hand wheel 350 a sufficient number of revolutions to move the side frame members 31 and 32 one inch outwardly from their previous positions. As both side frame members move concurrently, this makes an overall change of two inches in the spacing between the members 31 and 32 as required. This arrangement permits the apparatus 330 to be quickly and accurately adjusted for doors of different width, for example eighteen inches to thirty-six inches, and thus permits a substantial decrease in the set-up time for changing the apparatus 330 from one size of door frame to another.

To further decrease the amount of time required for changing from one size of door to another, it will be noted that the pressure-applying means or clamps 362 are concurrently adjusted with the respective side frame members 31 and 32. Each of the clamping devices 362 is carried by one of the supports 359, which in turn are carried by the side frame members 31 and 32, as shown in FIGS. 15 and 17. After the side jambs 10, 10, the head jamb 12, the trim strips 19, 20, 21 and the door stop members 23, 23, 23a have been placed on the apparatus 330, as shown in FIG. 15, the clamps 362 are operated from their retracted or unclamped position of FIG. 18 to their extended or clamped position of FIG. 19. As shown in FIG. 15, a plurality of the clamping devices 362 are employed. There are preferably three or more pairs of the devices 362 spaced along the apparatus 330 as indicated in FIG. 15. The devices 362 are adapted to be operated by rotatable shafts 363a and 363b, which are in turn adapted to be rotated by the levers 364 and 365. It will be noted that all of the clamping devices 362 associated with side frame member 32 are adapted to be operated by lever 364 whereas all of the clamping devices 362 associated with side frame member 31 are adapted to be operated by lever 365.

Each of the pressure-applying means or devices 362 is identical in construction and thus only one will be described in detail. The devices 362, when in their extended positions, are adapted to hold the side jambs, the trim strips and the door stop strips in predetermined positions relative to each other during an assembling operation. This predetermined position is the one which the jambs, trim strips and door stop strips must assume in order to permit the door to hang properly in the casing when the complete unit is assembled.

Referring to FIGS. 18-20, each of the clamping devices 362 employs a pair of side plates 440 which are identical with each other. The side plates 440 are mounted on foot members 441, one disposed at each end of the mechanism 362. The foot members 441 are adapted to be secured to the supports 359 by any suitable means, such for example as bolts 410. The side plates 440 are adapted to be held in spaced relation and to the foot members 441 by spacers 442a and pins 442 at the lower end. Another spacer 442a and pin 442 are employed at the upper left-hand corner, FIG. 18. Each of side plates 440 is provided with a horizontal slot 444 and an inclined slot 445. A pin 446 is disposed between the plates 440 and is provided with a spacer sleeve 447 which is adapted to extend through a slot 448 in the lower portion of a pair of levers 449, FIG. 20. The levers 449 are pinned at their lower ends as by a pivot 450 to opposite sides of a collar 451 which in turn is fixed to and rotatable with the operating shaft 363b which extends through each of the side plates 440. The upper ends of the levers 449 are provided with slots 454 through which extends a pin 455 which also extends through the slots 444 in the plates 440. The pin 455 is provided with a series of sleeves 456-460 which form anti-friction bearing members for each of the respective plates 440, 440, the levers 449, 449 and the plunger member 461. The pin 455 and sleeves 456-460 are held in place by a pair of cover plates 439 secured to the respective side plates 440.

The plunger 461 has a narrow tongue portion 461a at its rear end which extends between the upper ends of the pair of levers 449, FIGS. 18 and 20. The forward end of the plunger 461 has a width corresponding to the spacing between the plates 440. A supporting plate or saddle member 462 is secured to the top surface of plunger 461 by a screw 463 and is adapted to support the plunger 461 when it is in its unlocked position, FIG. 18, and also during return from the locked or forward position, FIG. 19. The lower surface of plunger 461 is provided with a pair of inclined surfaces 464 and 465. The surface 465 is inclined at approximately the same angle as the slot 445 in the side plates 440. A block or carriage member 467 is adapted to slide in the spaced, inclined slots 445 and block 467 is biased towards the outer ends of the slots 445 by tension spring 468, one end of which is fixed to the plates 440 by a pin 469 and the other end of which is connected to the opposite end of block 467 by a connector 470, FIGS. 18 and 19. The block 467 is held in the slots 445 by guide members 467a disposed on opposite sides of the block.

When the mechanism 362 is in the unlocked position, the various parts thereof are in the position shown in FIG. 18. A tension spring 471, which is connected at one end to the forward end of plunger 461 and at the lower end to pin 442, is adapted to hold the saddle member 462 on the top of plunger 461 against the upper edge of the side plates 440. To move the mechanism to the locked or clamping position, FIG. 19, the shaft 363b is rotated in a counterclockwise direction, as indicated by the arrow in FIG. 18 and the space levers 449 are adapted to pivot about their central pivot 446, thus forcing the plunger 461 to the right. The plunger 461 slides forward with the plate 462 on the upper edge of the side plates 440 until the inclined surface 465 engages the upper surface of block 467. At this time, the plunger 461 moves upwardly due to the engagement of the inclined surface 465 with block 467 raising the plate 462 above the upper edge of the side plates 440. This causes the forward jamb-engaging assembly 487 likewise to move forward and upwardly over the edge of the jamb 10 against which the assembly 487 is to be clamped, FIG. 19. This action is important in order to clamp the side jambs 10 in proper relation to their corresponding stops 23 and trim strips 19 and 20.

At the outer end of the arm or plunger 461 is disposed a threaded extension 486, one end of which is adapted to be received in the threaded opening 461b. The other end of the threaded extension 486 is adapted to be received in a threaded opening 488a in a pressure member 488. The upper surface of the pressure member or block 488 has secured thereto another pressure member 489. The pressure members 488 and 489 are disposed at substantially right angles to each other, as may be seen in FIGS. 18 and 19. The pressure member 488 has been shown in the form of a block having a lower plate 488b on its lower surface adapted to engage the upper surface of stop member 23. The outer vertical surface of member 488 is adapted to engage the inner vertical surface of the jamb member 10. The pressure member 489 likewise performs two functions with its lower surface adapted to engage the uppermost surface of jamb 10 and the outer vertical surface of member 489 being adapted to engage the inner edge of trim strip 19. The jamb-engaging assembly 487 also includes a finger 490 carried by the pressure member 489. The finger 490 acts as a cam which engages the upper surface of the trim strip 19 and holds the trim strip against the upper edge of the jamb 10, as shown in FIG. 19. The plunger 461 and the block 488 are adapted to be secured to the respective ends of threaded member 486 by set screws 484 and 485 respectively. The threaded extension 486 permits the overall length of the plunger 461 to be adjusted to accommodate jambs of different thickness. The plate 488b is adjustable relative to block 488 by shims 488c to control the spacing between the stop 23 and the edge of jambs 10 as determined by plate 488b and member 489, FIG. 19.

Referring again to FIGS. 18 and 19, it will be seen that continued rotation of shaft 363b and its integral wheel portion 451 causes the pair of levers 449 to rotate about the central pivot 446 moving the inclined surface 465 of plunger 461 over the block 467 until the step or shoulder 474 between the inclined surfaces 465 and 464 reaches the forward end 467a of of block 467. At this time the plunger 461 moves downwardly, dropping the surface 464 into engagement with the upper surface of block 467 with the shoulder 474 in engagement with the outer end 467a of block 467. When the shoulder 474 drops into engagement with the outer end 467a of block 467, the supporting plate 462 is then in engagement with the upper end of the side plates 440. Continued rotation of shaft 363b causes the levers 449 to move the plunger 461 further in an outward direction towards the right. The block 467 moves with the plunger 461 and is maintained in engagement against the shoulder 474 by reason of the tension spring 468. This movement continues until the block 467 reaches the end of its slots 445, as shown in FIG. 19.

In order to lock the plunger 461 in its forward position at the end of its forward stroke, the shaft 363b is further rotated in a counterclockwise direction and this causes the spaced levers 449 to move downwardly until the upper ends of the slots 454 are closely adjacent the rollers on the pin 455. At this time the pivot pin 450 has moved to a position below the axis of the shaft 336b which is an over-center position, thus locking the levers 449 in a substantially vertical position so that they cannot be rotated in a backward direction by applying pressure to the upper ends of levers 449. This prevents the plunger 461 from being moved to a retracted position upon application of pressure to the outer end of plunger 461 by the jamb-engaging assembly 487.

Since the jambs 10 are made of wood and frequently are warped to a certain degree, it is necessary that the plunger 461 be provided with a certain amount of biasing pressure to hold the jambs against the side frames 31 and 32 of the apparatus 330. This is accomplished by means of a spring mechanism inside of the plunger 461. As will be seen in FIGS. 18 and 19, the interior of the plunger 461 is provided with a compression spring 480 which is adapted to be compressed within a chamber 481, which is in line with threaded opening 461b. The compression spring 480 is held between the head end 483 of a piston member 482 and a screw member 485 which is threaded into the opening 461b rearwardly of the threaded extension 486. It will be noted that the threaded member 485 is separate from the threaded extension member 486 and thus the latter is permitted to be turned for adjustment without turning the compression spring 480.

As may be seen in FIGS. 18 and 19, the portion 461a of plunger 461 is provided with an elongated slot 461c through which the pin 455 and its associated bearing sleeve 458 extend. The piston 482 also extends lengthwise through portion 461a into the slot 461c and the end of the piston 482 is adapted to engage the sleeve 458. The compression spring 480 holds the plunger 461 and the assembly 487 against the jamb, as shown in FIG. 19. However, due to the slot 461c, the plunger 461 may be forced to the left, as shown in FIG. 19, a distance corresponding to the spacing between the sleeve 458 and the end of slot 461c. This provides the spring bias action which forces the jamb 10 against the side frame 31 of the apparatus 330, and maintains the lever arms 449 in their over-center locked position as shown in FIG. 19.

Referring to FIGS. 21-23, there is shown a modification 562 of the clamping mechanism 362 shown in FIGS. 18–20. The mechanism 562, FIGS. 21-23, is interchangeable with the various mechanisms 362. The mechanism 562 employs a pair of side plates 511 which are identical with each other. The side plates 511 are mounted on foot members 512, one disposed at each end of the mechanism 562. The side plates 511 are adapted to be held in spaced relation and to the foot members 512 by pins 514 at the lower end and a spacer 515 on a pin 515a at the upper left-hand corner. The lower pins 514 serve as pivots for a rear operating lever 516 and a forward lever 517. The two levers 516 and 517 are interconnected at their midpoints by a link 518. In the upper end of the side plates 511 there are provided horizontal slots 520 which are adapted to receive a cross pin 521 which passes through an arm or plunger member 522 disposed between the plates 511. The cross pin 521 is secured to plunger mmeber 522. The plunger member 522 is provided with an inclined slot 523 near its forward end which is adapted to receive a movable cross pin 524 which extends through the upper end of the forward lever 517. It will be noted that the upper end of lever 517 is bifurcated and pin 524 is secured thereto as shown in FIG. 22. A tension spring 526 interconnects the rear end of plunger 522 with the forward lever 517. The front end of the plunger 522 is provided with a clamping head assembly 527 which includes a main block 528, an upper adjustable plate 529 and a lower plate 530. The clamping head assembly 527 is adapted to engage the jamb 10, stop 23 and trim 19 in manner similar to the assembly 487 described in connection with the modification shown in FIG. 18.

The front end of the plunger 522 is provided with a threaded rod 531 which extends into an enlarged opening 532 in the block 528. A set screw 533 extends down through an enlarged hole 534 in the top of block 528 into the extension rod 531. It will be noted that this construction permits the assembly 527 to have freedom of movement, both laterally and transversely, similar to a universal joint. This freedom of movement is important in order that the assembly 527 can adjust itself to the jamb when it is moved into clamping position by the operating lever 516. The rear end of member 531 is threaded and is adapted to be received by a threaded opening in the forward end of plunger 522 to permit adjustment of the clamping assembly 527 relative to the end of plunger 522. This adjustment is similar to the adjustment of clamping assembly 487 which is carried by threaded member 486 and described in connection with FIGS. 18–20.

To move the mechanism 562 to clamping position, the lever 516 is moved to the right at its upper end thus pivoting the levers 516 and 517 about their lower pivot pins 514. At the same time the cross pin 521 is moved from the left-hand end of slot 20 to the right-hand end along with the plunger 522. When the pin 521 reaches the right-hand end of slot 520, the forward lever 517 continues to pivot about its pin 514, but in doing so causes the pin 524 at the upper end of lever 517 to move from the rear of slot 523 to the upper forward end of slot 523. This provides a cam action which forces the forward end of plunger 522 in a downward direction causing the plunger 522 to pivot about pin 521 which is now at the forward end of slot 520. The parts are so positioned that the plunger 522 will stay in this position under the bias of operating lever 516 thus permitting the clamping head assembly 527 to hold the jamb in position against the side frames 31 and 32 of the apparatus in similar fashion to the clamping head assembly 487 on clamping mechanism 462 previously described in connection with FIGS. 18–20.

It will be noted that the modification shown in FIG. 15 is provided with the same trim clamps 120 and 121 that are previously described in detail in connection with FIGS. 1, 2 and 7. These clamps 120 and 121 are adapted to hold the miter joints of the trim strips in proper relation while the screws 137, FIG. 7, are inserted in the respective corners of the trim strips. The clamps 120 and 121 are adapted to be carried by respective side members 32 and 31, FIG. 16, of the frame and are movable therewith. It will be recalled that a plurality of the clamping devices 362 are also carried by each of the side frames 31 and 32, FIG. 15. Thus it may be seen that in order to adjust the apparatus 330 for assembling door casings of different widths, all that is necessary to change from one size to the other is to rotate the hand wheel 350 in the required direction until the side frames 31 and 32 reach the positions corresponding to the new size door casing to be assembled.

The features of this invention not only reduce substantially the time required for assembly of door casings, but also reduce the time required for adjusting the apparatus to handle door casings of different widths. By reducing the amount of time required for these operations, a substantial production cost can be realized.

It shall be understood the invention is not limited to the specific arrangements shown, and that further changes and modifications may be made within the scope of the appended claims.

What is claimed is:

1. Apparatus for assembling door casings comprising a frame including a pair of side members and an end member disposed to form three sides of a rectangle corresponding to the shape of a door, said side members having means for supporting therebetween a pair of side jambs in spaced parallel face-to-face relation, said end member having means for supporting a head jamb at right angles to the side jambs and in contact with the head ends of the side jambs, said pair of side members each having means for supporting side trim members in overlying relation wtih the respective side jambs and substantially perpendicular thereto, said end member having means for supporting a head trim member in overlying relation with the head jamb at substantially right angles thereto, means for holding the ends of the head trim member in engagement with the adjacent ends of the side trim members preparatory to securing the head trim member to the respective side trim members, and a plurality of pressure applying means disposed at spaced locations between said pair of side members for concurrently applying force in an outward direction against the side jambs and their respective side trim members to hold the trim and jamb members in engagement in predetermined relation during the assembly of the trim strips with their corresponding jambs.

2. Apparatus according to claim 1 wherein said means for holding the head trim member in engagement with the side trim members comprises clamping means disposed at each of the corners formed by the head trim and the side trim members, each of said clamping means comprising a pair of arms at substantially right angles to each other and in a plane parallel to the plane of the trim members, adjustable means for moving said pair of arms along an axis bisecting the angle between said arms, and additional adjustable means effective on one of said arms for moving it relative to the trim members without movement of the other arm of said pair.

3. Apparatus for assembling door casings comprising a frame including a pair of side members and an end member disposed to form three sides of a rectangle corresponding to the shape of a door, said side members having means for supporting therebetween a pair of side jambs in spaced parallel face-to-face relation, said end member having means for supporting a head jamb at right angles to the side jambs and in contact with the head ends of the side jambs, said pair of side members each having means for supporting side trim members in overlying relation with the respective side jambs and substantially perpendicular thereto, said end member having means for supporting a head trim member in overlying relation with the head jamb at substantially right angles thereto, means for holding the ends of the head trim member in engagement with the adjacent ends of the side trim members preparatory to securing the head trim member to the respective side trim members, a plurality of pressure-applying means disposed at spaced locations between said pair of side members for concurrently applying force in an outward direction against the side jambs and their respective side trim members to hold the trim and jamb members in engagement in predetermined relation during the assembly of the trim strips with their corresponding jambs, and means for varying the spacing between said pair of side frame members and the overall length of each of said pressure-applying means for assembly of door casings to accommodate doors of different widths.

4. In apparatus for assembling door casings or the like, pressure-applying mechanism comprising a pair of spaced side plates, each of said side plates having an upper slot and a lower slot, a plunger disposed between said side plates, a pressure member carried by one end of said plunger and adapted to engage a portion of the door casing, a pin extending through the other end of said plunger and through said upper slot of said plates, a carriage member adapted to ride in the lower slot of said plates for supporting said one end of said plunger, and means for actuating said plunger to move said pressure member into and out of clamping engagement with the door casing.

5. Apparatus according to claim 4 wherein said last-named actuating means comprises a link connected at one end of said pin and at the other end to a rotatable member carried by said pair of side plates.

6. Apparatus according to claim 4 wherein said lower slots are inclined upwardly towards said pressure member, and the surface of said plunger which engages said carriage is provided with a similar inclined surface whereby said pressure member is concurrently moved outwardly and upwardly by said actuating means.

7. Apparatus according to claim 6 wherein said inclined surface on said plunger terminates in a shoulder so that said plunger drops off of said carriage at the end of its stroke by said actuating means, and supporting means carried by said plunger for engaging said side plates to support the leading end of said plunger when the latter is out of engagement with said carriage.

8. Apparatus for assembling door casings comprising a frame including a pair of side members and an end member disposed to form three sides of a rectangle conforming to the shape of a door, said side members having means for supporting therebetween a pair of side jambs in spaced parallel face-to-face relation, said end member having means for supporting a head jamb at right angles to the side jambs and in contact with the head ends of the side jambs, said pair of side members each having means for supporting side trim members in overlying relation with the respective side jambs and substantially perpendicular thereto, said end member having means for supporting a head trim member in overlying relation with the head jamb at substantially right angles thereto, means for holding the ends of the head trim member in engagement with the adjacent ends of the side trim members preparatory to securing the head trim member to respective side trim members, a plurality of pressure-applying means disposed at spaced locations between said pair of side members for concurrently applying force in an outward direction against the side jambs and their respective side trim members to hold the trim and jamb members in engagement in predetermined relation during assembly of the trim strips with their corresponding jambs, part of said plurality of pressure-applying means being carried by each of said side members of said frame, and means for adjusting said pair of side members relative to each other to accommodate door casings of different widths.

9. In apparatus for assembling door casings or the like, pressure-applying mechanism comprising a pair of spaced side plates, each of said side plates having a horizontal slot adjacent the upper end thereof, a plunger disposed between said side plates, a pressure member carried by one end of said plunger and adapted to engage a portion of the door casing, a pin extending through the other end of said plunger and through said slot of said plates, a surface on said plunger inclined upwardly towards said pressure member, and movable structure engageable with said inclined surface to guide the movement of said pressure member.

10. Apparatus according to claim 9 wherein said inclined surface on said plunger comprises a slot and said structure engageable with said inclined surface comprises a pin extending through said slot, said pin being carried at the outer end of a pivoted lever.

11. Apparatus according to claim 9 wherein said inclined surface on said plunger is disposed on the lower surface of said plunger, said pair of side plates each having a slot therein inclined upwardly towards said pressure member, and a carriage member is adapted to ride along said inclined slots for engagement with said inclined surface of said plunger.

References Cited in the file of this patent

UNITED STATES PATENTS

| 199,579 | Rose | Jan. 22, 1878 |
|---|---|---|
| 689,061 | Bromm | Dec. 17, 1901 |
| 978,187 | Miller | Dec. 13, 1910 |
| 1,169,671 | Nihlen | Jan. 25, 1916 |
| 1,226,763 | Ferney | May 22, 1917 |
| 1,246,466 | Reeves | Nov. 13, 1917 |
| 1,335,574 | George | Mar. 30, 1920 |
| 1,342,892 | Bergstrom | June 8, 1920 |
| 1,434,946 | Fiorillo | Nov. 7, 1922 |
| 1,695,461 | Kalgren | Dec. 18, 1928 |
| 2,235,235 | Price | Mar. 18, 1941 |
| 2,262,827 | Wilson et al. | Nov. 18, 1941 |
| 2,355,603 | Zern | Aug. 8, 1944 |
| 2,415,259 | Renton | Feb. 4, 1947 |
| 2,427,081 | Zeren | Sept. 9, 1947 |
| 2,502,166 | McKay | Mar. 28, 1950 |
| 2,605,790 | Schwarzer | Aug. 5, 1952 |
| 2,605,791 | Zern | Aug. 5, 1952 |
| 2,662,565 | LeVay | Dec. 15, 1953 |
| 2,679,696 | Reeder | June 1, 1954 |
| 2,684,090 | Bernitz | July 20, 1954 |
| 2,734,574 | Reid | Feb. 14, 1956 |
| 2,753,602 | Ringle | July 10, 1956 |
| 2,754,862 | Kemp | July 17, 1956 |
| 2,781,559 | Savoie | Feb. 19, 1957 |
| 2,801,655 | Zern | Aug. 6, 1957 |
| 2,823,428 | Curtz | Feb. 18, 1958 |
| 2,929,422 | Tyler et al. | Mar. 22, 1960 |

FOREIGN PATENTS

| 121,940 | Sweden | June 15, 1948 |
|---|---|---|
| 58,550 | Germany | Sept. 1, 1891 |

UNITED STATES PATENT OFFICE

CERTIFICATE OF CORRECTION

Patent No. 3,015,348                      January 2, 1962

Warren B. Zern

It is hereby certified that error appears in the above numbered patent requiring correction and that the said Letters Patent should read as corrected below.

Column 3, line 66, for "roor" read -- door --; column 10, line 13, after "is" insert -- a --; line 54, for "102" read -- 103 --; column 15, line 33, for "jambs" read -- jamb --; column 17, line 22, for "462" read -- 363 --.

Signed and sealed this 24th day of July 1962.

(SEAL)
Attest:

ERNEST W. SWIDER
Attesting Officer

DAVID L. LADD
Commissioner of Patents